W. R. PETTICREW.
TOY VEHICLE.
APPLICATION FILED NOV. 7, 1917.
1,289,894.
Patented Dec. 31, 1918.
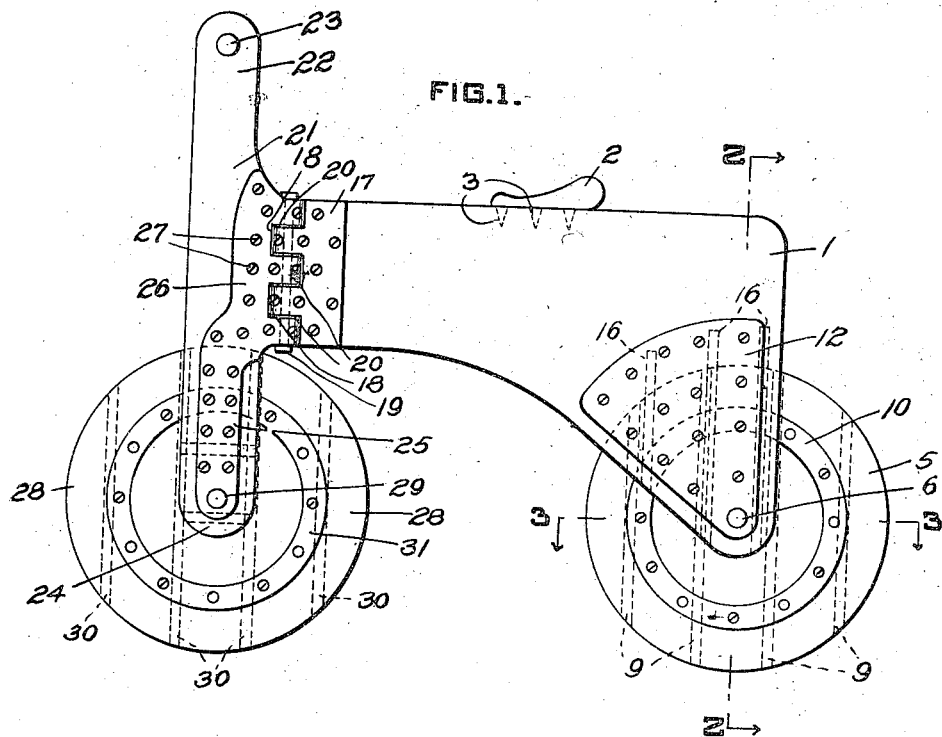
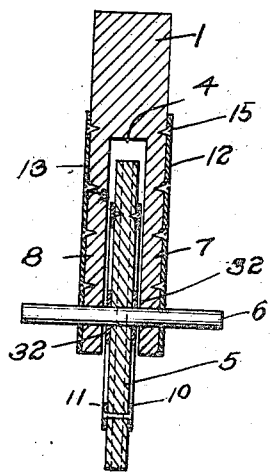
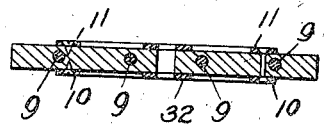
WITNESSES
J. Herbert Bradley
Jo. Baily Brown
INVENTOR:
WILLIAM R. PETTICREW
By Fred'k W. Winter,
his attorney.

UNITED STATES PATENT OFFICE.

WILLIAM R. PETTICREW, OF PITTSBURGH, PENNSYLVANIA.

TOY VEHICLE.

1,289,894.

Specification of Letters Patent.   Patented Dec. 31, 1918.

Application filed November 7, 1917.   Serial No. 200,829.

*To all whom it may concern:*

Be it known that I, WILLIAM R. PETTICREW, a resident of Pittsburgh, in the county of Allegheny and State of Pennsylvania, have invented a new and useful Improvement in Toy Vehicles, of which the following is a specification.

This invention relates to vehicles, and more particularly to such devices for use as playthings for children.

The objects of the invention are to provide a vehicle for children or others of a form which will be durable, capable of withstanding the rough usage to which such articles are subject, the parts being few in number and assembled and held together in a simple and strong manner. Another object of the invention is to so construct this device that it may be made entirely of wood, except for certain metal reinforcing and fastening devices. Another object is to so reinforce the wooden wheels and wooden bearing that the danger of warping or splitting along the grain of the wood may be avoided. Another object is to so construct the whole device that it may be a useful and pleasing plaything for children, affording them vigorous exercise and instruction in the art of bicycle riding as well as entertainment and means of travel.

Referring to the drawings, Figure 1 is a side elevation; Fig. 2 is a vertical section on the line 2—2 of Fig. 1; and Fig. 3 is a central cross section through one of the wheels.

The device is a sort of a modified form of the ordinary bicycle, propelled by the rider's feet contacting the ground surface rather than by driving one of the wheels by means of pedals. The latter construction may, however, be applied to this vehicle, by slight modifications. In order that the device may be driven by the feet of the rider on the ground surface, the body of the vehicle is constructed so as to be comparatively low and the wheels and frame are of appropriate size to secure the proper height of the rider from the ground. The front wheel is so mounted as to be dirigible, and is used to steer the vehicle. Consequently, a child can sit astride the device with feet touching the ground surface on either side and by hand can turn the front wheel in any direction desired, propelling it forward by successive shoves or jumps, as will be obvious. This secures a vigorous exercise, provides a pleasant plaything and efficient means of travel.

The device comprises a main body portion 1, made of one or more wooden boards, having a wooden seat or seats 2, of any desired form attached to the body by screws 3. At the rearward portion the body extends downward, to form a sort of projection, this projecting portion being cut out at its middle part to form a slotted opening 4, in which a wooden wheel 5 is free to turn. The wheel is mounted in the body by means of an axle 6 extending through the two body portions 7 and 8 on each side of the opening 4. The axle 6 may be either fastened to the wheel and rotatable in bearings formed by parts 7 and 8, or fixed in the latter parts and forming a journal upon which the wheel itself may turn. The preferable construction is to have the wheel rotatable on the axle, so that the ends of the axle, which project for some distance outside the frame, may ordinarily be non-moving, and furnish supports for a passenger who may stand on these extensions behind the rider occupying the seat.

In order to reinforce the wheel 5, to prevent any warping or twisting out of shape thereof, it may be formed of two or more boards fastened together with the grain of the wood of the several boards arranged across each other, *i. e.*, laminated so that the wheel can not split, and so that there will be resistance to warping or distortion of any kind. Or, if the wheel is of one piece, it may be bored through from edge to edge across the grain and dowel pins 9 passed through the bores to prevent warping, splitting or other distortions. Also, preferably, reinforcing metal rings 10 and 11, concentric with the axle of the wheel, may be bolted, screwed, or riveted to sides of the wheel, serving to reinforce the entire structure in obvious manner.

In similar manner the projections 7 and 8 of the body extension to the wheel axle may be reinforced by metal plates 12 and 13 attached to the outside of the body by means of suitable screws 15. Dowel pins 16 may be set in across the grain of the wood, as shown on Fig. 1, to reinforce this portion of the body.

Attached to the forward end of the body by any suitable means such as bolts, screws, or rivets, is a metal plate member 17, having two or more forward extensions 18.

Vertically alined holes through the wood of extension 18 are adapted to receive a bolt 19 which also passes through rearward extensions 20, of a second body member 21, as shown on Fig. 1. By this means, the bolt 19 and the overlapping projections form a hinged connection between the main body portion, and the forward body portion, which allows the lateral turning of the two body portions with respect to each other, but prevents any other relative movement, and the form of joint shown, is of such size as to give great strength.

The forward body portion 21 has an upward extension 22, through or fitted into which is one or more transversely fixed wooden bars 23, forming hand holds on each side of the body member for the use of the rider in steering the vehicle. This body member also has a downward extension 24, which is reinforced on each side by extensions 25 of reinforcing metal members 26 which extend up to and reinforce the projections 20 above described. These metal plates are fastened to the wooden body portion by any suitable means, such as screws 27.

The extension 24 is slotted out at its middle point throughout, in order to form an opening in which the front wheel 28 may be freely carried. This wheel is of wood and is mounted on an axle 29, and extends through the member 24 near its lower end, as shown on Fig. 1. This axle may be attached rigidly to the wheel, and rotatable in its bearings, or may be fixed in its bearing in the body member and act as a journal for the wheel. Or, the axle may be fixed in the wheel and rotatable in bearings in the body member, and the outer ends may have attached thereto crank arms and pedals similar to the ordinary bicycle, so that this wheel may be driven by the rider, or the axle may be extended to form foot rests for the rider.

This front wheel when not laminated, is reinforced by dowel pins 30 extending through it across the grain of the wood, or may have concentric reinforcing rings 31, similar to those described in connection with the rear wheel. This wheel may also be of laminated construction, the various layers of wood being turned so that their grains cross. Concentric rings 32 may be provided on each side of both wheels, having a central opening therethrough adapted to engage the axle. These rings, therefore, prevent undue wear of the wooden bearing, and also reinforce the wheel.

The economy and strength of the construction, the ease of assembling, and the safety of the whole construction, as well as other advantages, will be apparent to those familiar with such devices.

I claim:

A child's vehicle comprising a main body portion of wood having a seat mounted thereon and a rearward slotted extension adapted to carry an axle, projections of said axle on each side of the body member, a wheel mounted on the axle, metal members outside the body member engaging the axle, a second body portion hinged to the first and carrying an axle having a wheel mounted thereon, metal members on the outside of the second body member engaging the axle, and a cross bar through the second body member whereby to turn it relative to the main body member to guide the vehicle.

In testimony whereof I have hereunto set my hand.

WILLIAM R. PETTICREW.

Witness:
Jo. BAILY BROWN.